ent. Patented Nov. 22, 1960

2,961,435

PROCESS FOR POLYMERIZATION OF ETHYLENE WITH A TITANIUM MONOXIDE CATALYST

David S. Breslow and Albert S. Matlack, Wilmington, Del., assignors to Hercules Powder Company, Wilmington, Del., a corporation of Delaware No Drawing. Filed May 27, 1957, Ser. No. 661,566

1 Claim. (Cl. 260—94.9)

This invention relates to the polymerization of ethylene under relatively mild conditions of pressure and temperature and, more particularly, to an entirely new type of catalyst system for the polymerization of ethylene under such conditions.

K. Ziegler has described the polymerization of ethylene with organometallic compounds of the metals of group III–A of the periodic table, i.e., organometallic compounds of aluminum, gallium and indium to produce polymers varying in molecular weight from dimers up to the wax range polymers. He has also described the preparation of high molecular weight crystalline polymers by contacting ethylene with a mixture of an organo-aluminum compound and a compound of a metal of group IV–B, V–B, VI–B or VIII of the periodic table.

Now in accordance with this invention it has most surprisingly been discovered that ethylene may be polymerized to a high molecular weight crystalline polymer under relatively mild conditions of temperature and pressure by contacting ethylene with a freshly exposed surface of a finely divided titanium monoxide. Not only is the process of this invention very effective for the polymerization of ethylene, but the crystalline polymer produced is a more highly saturated polymer than is produced by the prior art processes.

The polymerization of ethylene in accordance with this invention may be carried out in a wide variety of ways. It may be carried out in the presence or absence of an inert organic diluent as reaction medium. Generally, a diluent is used because it simplifies the isolation of the polymer at the end of the polymerization reaction. Any inert liquid organic diluent may be used, as for example, aliphatic hydrocarbons such as hexane, heptane, etc., cycloaliphatic hydrocarbons such as cyclohexane or aromatic hydrocarbons such as benzene, toluene, xylene, etc., or any mixture of such hydrocarbons, halogenated hydrocarbons such as methylene chloride, ethylene chloride, chloroform, carbon tetrachloride, chlorobenzene, etc.

As already mentioned, the titanium monoxide to be effective as a catalyst for the polymerization is preferably in a finely divided state and presents a freshly exposed surface to the ethylene with which it is contacted. Such a finely divided or activated form of titanium monoxide may be obtained by ball milling the oxide in an inert atmosphere, preparing it in colloidal form, etc. In general, the finely divided oxide will have an average particle size varying from about 1 micron or less to about 100 microns and preferably from about 1 micron to about 20 microns. Any desired means may be used for contacting the ethylene with the finely divided titanium monoxide having an active surface. A particularly effective method of carrying out the process in accordance with this invention is to ball mill the titanium monoxide in the presence of ethylene, either with or without a diluent. By so doing, a fresh surface of the catalyst is continually contacted with the ethylene being polymerized. A polymerization so started may be transferred to another vessel provided with adequate agitation such as one with a high shear agitator. When operating in a ball mill, the oxide may be in any desired shape, as for example, granules, flake, etc., which will, of course, be reduced to the desired size during the ball milling operation, but for maximum efficiency it is preferably used in the form of finely divided powder or flake. The process of this invention may be operated either on a batchwise scale or as a continuous operation.

The amount of the titanium monoxide used as the catalyst may be varied over a wide range from a minor catalytic amount to a large excess and will in general be governed by the type of operation used. Thus, in a ball mill, relatively small amounts may be used, the maximum amount that may be used depending upon the efficiency of the ball mill operation with such larger amounts.

The temperature and pressure used for the polymerization process may be varied over a wide range and will largely depend upon the method by which the ethylene is contacted with the surface of the oxide. In general, the polymerization will be carried out at room temperature or slightly above, but any temperature within the range of from about −80° C. to about 200° C. may be used, preferably from about 0° C. to about 100° C., and more preferably from about 20° C. to about 60° C. In the same way, while atmospheric pressure or a pressure of only a few pounds may be used, the polymerization may be carried out over a wide range of pressures, but higher pressures do not appreciably alter the course of polymerization and, hence, are not required. In general, it is desirable to operate under anhydrous and anaerobic conditions.

The following example will demonstrate the process of polymerizing ethylene in accordance with this invention. The molecular weight of the polymer produced is indicated by the Reduced Specific Viscosity (RSV), by which term is meant the $\eta_{sp}/c$ determined on an 0.1% solution of the polymer in decalin, containing 0.1 g. of the polymer per 100 ml. of solution (unless otherwise indicated), at 135° C. The melting point given for the polymer is the temperature at which the birefringence due to crystallinity disappears. All parts and percentages are by weight unless otherwise indicated.

*Example*

The polymerization was carried out in a cylindrical vibratory ball mill which was constructed of stainless steel (analysis: carbon—0.008% max.; Cr—18.00–20.00%; Ni—8.80–10.00%; Mn—2.00% max.) and outfitted with a gas inlet tube and a main opening. The mill was 80% full of 0.5 inch stainless steel balls.

The mill, previously dried for 4 hours at 120° C., was charged with 70 parts of n-heptane which had been dried over sodium and 1 part of titanium monoxide. The mill was then capped, twice filled with dry nitrogen and evacuated, and ethylene was injected to a pressure of 50 p.s.i.g. After 16 hours of milling at room temperature (about 30° C.) the polymer slurry was removed from the mill. The polyethylene was isolated by filtration. The polymer so obtained was purified by leaching with a 50:50 mixture of n-butanol and 48% hydrofluoric acid for 16 hours at room temperature, again separating the polymer by filtration and washing it free of acid with water and ethanol and then drying for 16 hours at 80° C. in vacuo. The final pressure, yield of polymer obtained and physical properties are tabulated below in comparison with a control run wherein no catalyst was added.

| Catalyst Added | Final Pressure, p.s.i.g. | Percent Conversion | RSV | Melting Point, °C. |
|---|---|---|---|---|
| None | 50 | 0 | | |
| Titanium Monoxide | −9 | 91 | 2.8 | 134 |

The many advantages of the process of this invention will be at once apparent to those skilled in the art. It is a halogen-free catalyst system, hence, the problem of mold corrosion encountered on molding the polymer is eliminated. The use of the hazardous, spontaneously inflammable, aluminum alkyls, used in the prior art processes, is avoided. Other advantages lie in the better control that may be had in a one-component catalyst system, less equipment required, less need for blanketing operations with inert gases, etc.

What we claim and desire to protect by Letters Patent is:

The process of producing a solid polyethylene which comprises ball milling a mixture of ethylene and finely divided titanium monoxide, as the sole polymerization catalyst present.

References Cited in the file of this patent
UNITED STATES PATENTS

| | | |
|---|---|---|
| 2,681,848 | Wainer et al. | June 22, 1954 |
| 2,692,258 | Roebuck | Oct. 19, 1954 |
| 2,700,663 | Peters | Jan. 25, 1955 |
| 2,721,189 | Anderson et al. | Oct. 18, 1955 |
| 2,791,576 | Field et al. | May 7, 1957 |
| 2,848,303 | Cooper | Aug. 19, 1958 |
| 2,878,240 | Schmerling | Mar. 17, 1959 |

FOREIGN PATENTS

| | | |
|---|---|---|
| 1,135,599 | France | Dec. 17, 1956 |
| 534,792 | Belgium | Jan. 31, 1955 |

OTHER REFERENCES

Mellor: Comp. Treatise on Inorganic and Theo. Chem., vol. VII (1927), pub. by Longmans, Green & Company (New York), pages 27 and 28.

High Surface Sodium on Inert Solids (copyright 1953, 19 pages, pages 9–11 relied on); U.S. Industrial Chemicals Company, 120 Broadway, New York 5, N.Y.